(12) United States Patent
Birt

(10) Patent No.: US 6,884,941 B2
(45) Date of Patent: Apr. 26, 2005

(54) HOUSING ASSEMBLY

(75) Inventor: David Alan Birt, Cannock (GB)

(73) Assignee: ArvinMeritor Light Vehicle Systems (UK) Ltd., Stirchley (GB)

(*) Notice: Subject to any disclaimer, the term of this patent is extended or adjusted under 35 U.S.C. 154(b) by 146 days.

(21) Appl. No.: 10/238,991

(22) Filed: Sep. 10, 2002

(65) Prior Publication Data
US 2003/0047340 A1 Mar. 13, 2003

(30) Foreign Application Priority Data
Sep. 11, 2001 (GB) .............................................. 0121899

(51) Int. Cl.$^7$ ................................................. H02G 3/18
(52) U.S. Cl. ........................ 174/65 R; 174/50; 174/135
(58) Field of Search ................................. 174/65 R, 50, 174/17 R, 135, 64, 60, 48, 72 A, 68.1; 220/3.3, 3.8, 4.02, 3.9, 3.2, 3.5; 74/502.4, 502.5, 502.6, 500.5

(56) References Cited

U.S. PATENT DOCUMENTS

| | | | |
|---|---|---|---|
| 2,388,129 A | 10/1945 | Eisenbeis | |
| 3,038,730 A | 6/1962 | Bentley | |
| 3,787,129 A | 1/1974 | Kohler et al. | |
| 4,380,178 A | 4/1983 | Bennett et al. | |
| 4,649,010 A | * 3/1987 | Bennett et al. | ............ 74/502.5 |
| 4,773,279 A | * 9/1988 | Spease et al. | ............. 74/502.4 |
| 5,391,014 A | 2/1995 | Chen | |
| 5,531,134 A | * 7/1996 | Petruccello | ................ 74/502.4 |
| 5,531,489 A | 7/1996 | Cetnar | |
| 5,644,104 A | * 7/1997 | Porter et al. | .............. 174/65 R |
| 6,119,543 A | 9/2000 | Webb | |
| 6,308,395 B1 | * 10/2001 | Webb | ........................ 74/502.4 |
| 6,349,611 B1 | * 2/2002 | Nagle et al. | .................. 74/493 |

FOREIGN PATENT DOCUMENTS

| | | |
|---|---|---|
| DE | 87 10 674 | 9/1987 |
| FR | 2 526 506 | 11/1983 |
| FR | 2 763 983 | 12/1998 |
| GB | 1 266 294 | 3/1972 |
| WO | WO 98/55718 | 5/1998 |

OTHER PUBLICATIONS

European Search Report Dated May 28, 2003.
Search Report Under Section 17 for GB 01 21899.9 dated Jan. 29, 2002.

* cited by examiner

Primary Examiner—Dean A. Reichard
Assistant Examiner—Angel R. Estrada
(74) Attorney, Agent, or Firm—Carlson, Gaskey & Olds

(57) ABSTRACT

A housing assembly including a housing and cable assembly, the cable assembly including a cable outer, a first fitting, a second fitting, and a cable inner, the first fitting being connected to the cable outer, and including a first through hole and a first engagement portion, the second fitting including a second through hole and a second engagement portion, the cable inner passing through the first and second through holes, with the first engagement portion abutting the second engagement portion, in which the second fitting is secured to the housing by ultrasonic welding.

16 Claims, 2 Drawing Sheets

HOUSING ASSEMBLY

This application claims priority to Great Britain patent application number GB 01 21899.9 filed Sep. 11, 2001.

BACKGROUND OF THE INVENTION

The present invention relates to housing assemblies, in particular vehicle door latch housing assemblies including a latch housing and a latch cable assembly.

Known latch cable assemblies include a cable outer and a cable inner. The cable inner is connected at one end to a handle and at the other end to a moving part of a vehicle door latch. The latch is housed inside a latch housing, the cable outer being fixed to the latch housing such that movement of the handle acts to move the cable inner which operates the moving part of the latch.

It is also known to rigidly fix the cable outer to the latch housing. A cost effective and quick method of fixing the cable outer to the latch housing is by ultrasonic welding. However, the transmission of vibrations to the cable outer as a result of the ultrasonic welding can cause the cable outer to bum or melt.

When such a latch housing is assembled onto part of a vehicle door, it is often in a confined and/or difficult to access space. When assembling the latch (with the attached cable) to the vehicle it is necessary to manipulate the cable through various angles, which causes strain on the cable outer and its joint to the latch. The increased strain on the cable outer results in deformation and can lead to crack formation, particularly where the cable outer has been burned or melted as a result of ultrasonic welding. This increases the friction between the cable outer and inner, and in the case where a crack has formed, the cable inner is exposed to a potentially corrosive environment. This results in a decrease in performance of the cable assembly which is unacceptable to customers. Furthermore, the cable to latch joint can be destroyed, leading to non-opening of the door due to outer cable detachment.

This problem can be partially overcome by specifying cable outer materials of high flexibility. However such materials are costly.

SUMMARY OF THE INVENTION

An object of the present invention is to provide a cost effective housing assembly which at least partly overcomes the problems associated with ultrasonically welding a cable to a housing.

Thus, according to the present invention there is provided a housing assembly including a housing and cable assembly, the cable assembly including a cable outer, a first fitting, a second fitting, and a cable inner, the first fitting being connected to the cable outer, and including a first through hole and a first engagement portion, the second fitting including a second through hole and a second engagement portion, the cable inner passing through the first and second through holes, with the first engagement portion abutting the second engagement portion, in which the second fitting is secured to the housing by ultrasonic welding.

Advantageously, separate end fittings in loose abutting relationship provide a decoupling effect which reduces the transmission of vibrations to the cable outer as a result of ultrasonic welding, and thus there is less likelihood of damage to the cable outer.

Preferably one of the first engagement portion and the second engagement portion has a convex form and the other of the first engagement portion and the second engagement portion has a concave form.

Advantageously this reduces changes in working length of the cable inner relative to the cable outer as the cables flex.

Preferably the cable inner includes an end fitting shaped so as to retain the second fitting to the cable assembly.

Advantageously this allows the components of the cable assembly to be retained together during shipping and further assembly.

Preferably there is provided a housing assembly in which the second fitting is slidably adjustable relative to the housing.

Advantageously this allows the cable assembly to be adjusted relative to the housing so that the cable inner and outer are set relative to each other to enable the cable assembly to operate correctly.

According to another aspect of the present invention there is provided a method of providing a housing assembly including the steps of providing a cable assembly, the cable assembly including a cable outer, a first fitting, a second fitting, and a cable inner, the first fitting being connected to the cable outer, and including a first through hole and a first engagement portion, the second fitting including a second through hole and a second engagement portion, the cable inner passing through the first and second through holes, with the first engagement portion abutting the second engagement portion, providing a housing, assembling the cable assembly onto the housing, then ultrasonically welding the second fitting to the housing.

BRIEF DESCRIPTION OF THE DRAWINGS

The invention will now be described, by way of example only, with reference to the accompanying drawings, in which.

DETAILED DESCRIPTION OF THE DRAWINGS

Figure 1:
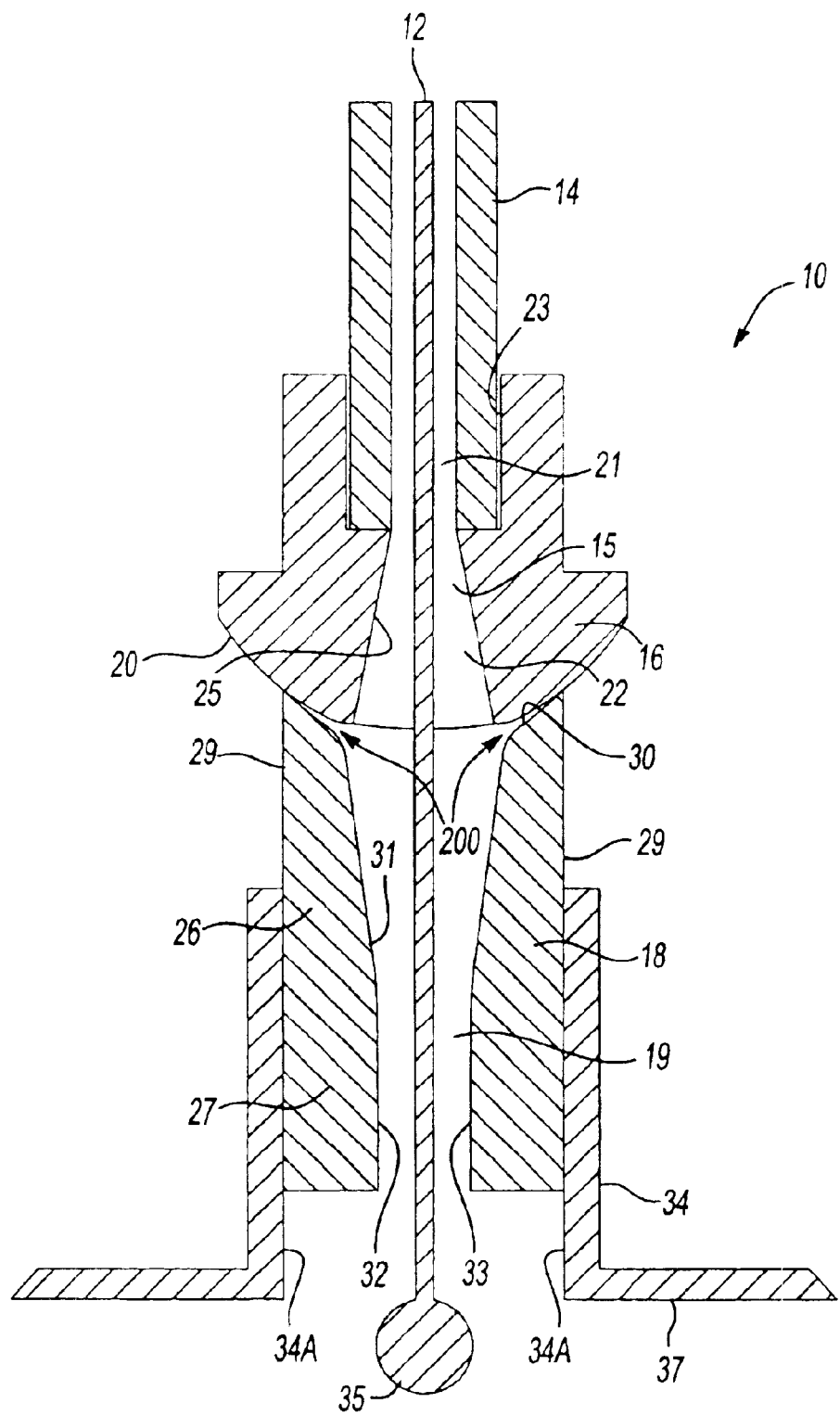
FIG. 1 is a sectional view of a housing assembly according to the present invention.

With reference to FIG. 1, there is shown a latch housing assembly 8, comprising a cable assembly 10, and a latch housing 37 (only part of which is shown).

The latch housing 37 has an upstanding projecting cylinder 34 having parallel internal sides 34A.

The cable assembly 10 includes a cable inner 12, a cable outer 14, a first end fitting 16 and a second end fitting 18.

The first fitting 16 has a first engagement portion 20 which is spherically shaped and convex.

The first fitting 16 has a first through hole 15. The first through hole 15 has a first upper portion 21 and a first lower portion 22. The first upper portion 15 has parallel sides, with internal surfaces 23. The first lower portion 22 is divergent towards the first engagement portion 20, with internal surfaces 25.

The first upper portion 21 has an internal diameter which corresponds to an external diameter of the cable outer 14, such that the cable outer 14 can locate in the first upper portion 15. The outer cable 14 is fixed to the first fitting 16 by a suitable process such as crimping. Alternatively other processes may be used such as using an adhesive to bond the cable outer 14 to the first fitting 16. However in further embodiments the cable outer 14 need not be fixed to the first fitting 16, e.g. it could have a 'loose' or 'sliding fit' connection.

The second fitting 18 has a second engagement portion 30 which is spherically shaped and concave, in the form of a cup, so as to enable co-operation with the first engagement portion 20. With the first and second engagement portions 20, 30, respectively, being spherically shaped, the first and second fittings 16, 18, respectively, are free to articulate relative to each other in two planes. First and second engagement portions 20, 30 form break 200 as shown.

The second fitting 18 has a second through hole 19. The second through hole 19 has a second upper portion 26 and a second lower portion 27. The second upper portion 26 is divergent towards the second engagement portion 30, with internal surfaces 31. The second lower portion 27 has parallel sides, with internal surfaces 32.

The second fitting 18 has a cylindrical external surface 29.

Since the first lower and second upper portions 22 and 26, respectively, of the first and second through holes 15 and 19, respectively, are divergent, some movement of the first fitting 16 relative to the second fitting 18 is possible before the cable inner 12 comes into contact with the divergent internal surfaces 25,31. This reduces the risk of damage to the cable inner.

The divergent internal surface 31 coincides with the internal surface 32 at cusp 33. The cusp 33 is sufficiently smooth such that if, during movement of the first fitting 16 relative to the second fitting 18, the cusp 33 comes into contact with the cable inner 12, the cable inner 12 is not damaged.

An end fitting 35 (nipple) is fixed to the cable inner 12 such that the second fitting 18 is retained on the cable inner 12, in particular the diameter of end fitting 35 is larger than the minimum diameter of second through hole 19.

The cable assembly 10 is secured to the latch housing 37 by ultrasonically welding the cylindrical external surface 29 of the second fitting 18 to the parallel internal sides 34A of the projecting cylinder 34.

The projecting cylinder 34 of the latch housing 37 has parallel internal sides 34A which correspond to the cylindrical external surface 29 of the second fitting 18, and hence it is possible to adjust the second fitting 18 relative to the latch housing 37 in the direction of arrow X prior to securing the second fitting 18 to the latch housing 37 by ultrasonic welding, so that the cable assembly 10 is in its fitted position, i.e. the cable inner 12 and outer 14 are set relative to each other to enable the cable assembly 10 to operate correctly that is to say the effective working length of the cable inner 12 can be adjusted relative to the cable outer 14 to take up manufacturing tolerance errors not just in the length of the cable outer 14 and cable inner 12 but also tolerances associated with where the end fitting 35 is connected to other components of the latch.

Thus it can be seen from FIG. 1 that the convex/concave abutting relationship between the first and second engagement portions 20 and 30, respectively, not only allows for relative movement between the first and second fittings 16, 18, respectively, in two planes, but also provides a decoupling effect between the first and second fittings 16, 18, respectively. This decoupling reduces vibration transmission to the cable outer (114) as a result of ultrasonic welding, thereby reducing the likelihood of burning the cable outer 14.

Figure 2:
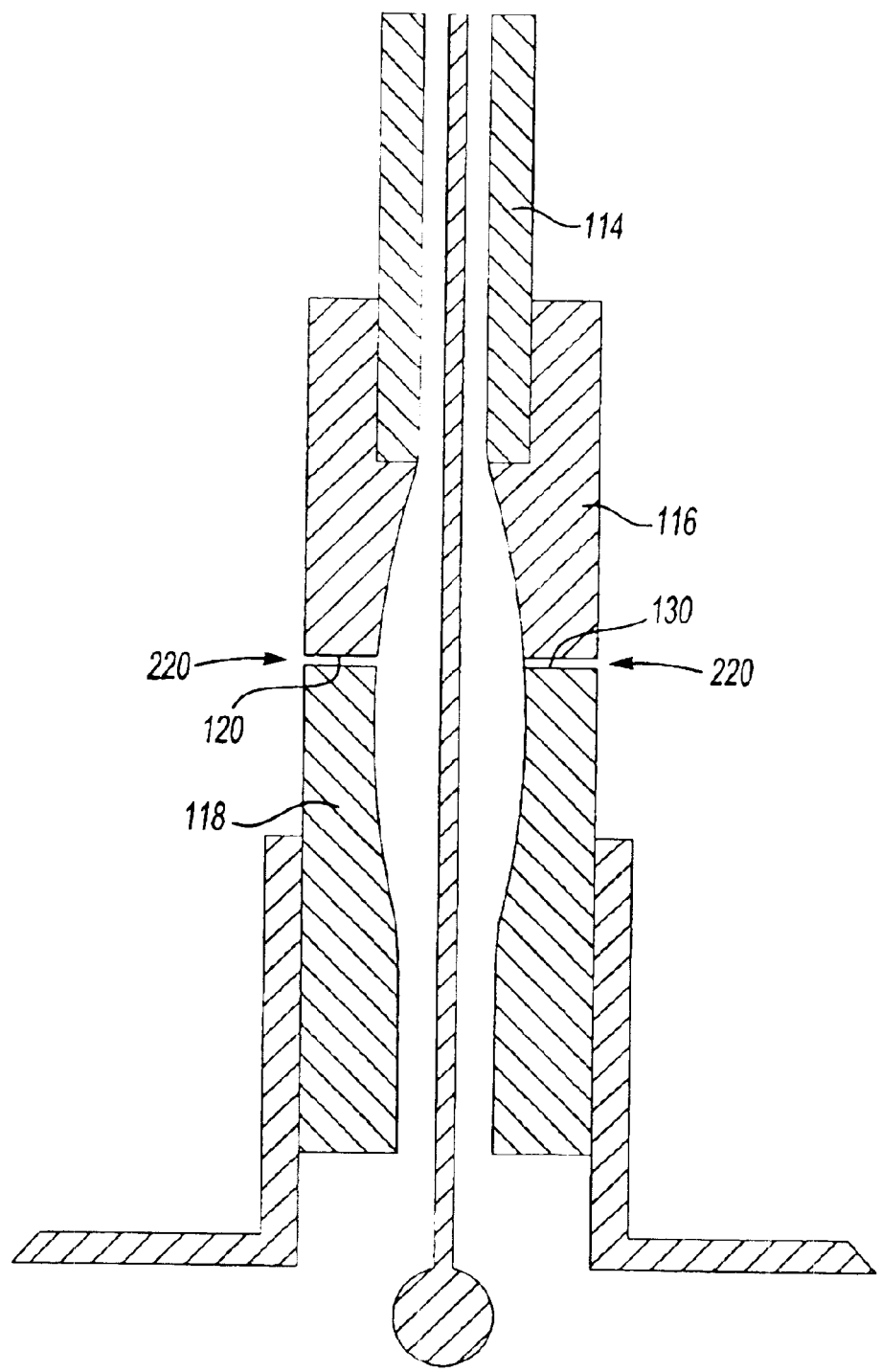
FIG. 2 is a sectional view of a housing assembly according to another embodiment of the present invention.

With reference to FIG. 2, there is shown an alternative housing assembly 108 in which features that perform the same function as those of the embodiment of FIG. 1 are numbered 100 greater.

It can be seen from FIG. 2 that the first engagement portion 120 and the second engagement portion 130 are flat unlike the convex/concave relationship of the embodiment of FIG. 1. First engagement portion 120 forms break 220 with second engagement portion 120 as shown.

Whilst the planar relationship of the first and second engagement portions 120 and 130, respectively, does not permit the same freedom of movement as the convex/concave relationship of the embodiment of FIG. 1, the fact that the planar surfaces can move relative to each other does provide a decoupling effect between the first fitting (116) and the second fitting (118). This decoupling reduces vibration transmission to the cable outer (114) as a result of ultrasonic welding, thereby reducing the likelihood of burning the cable outer 114.

Note that in further embodiments the engagement portions need not both be spherical or planar. One of the first or second engagement portions 120 and 130, respectively, could be spherical and the other of the first or second engagement portions 120 and 130, respectively, could be a planar surface having a through hole. This arrangement allows movement (articulation) between the first and second fittings 116 and 118, respectively, in all planes.

Alternatively, one of the first or second engagement portions 120 and 130, respectively, could be cylindrically convex, and the other of the first or second engagement portions 120 and 130, respectively, could be cylindrically concave, such that the movement between the first and second fittings 116 and 118, respectively, is limited to one plane. This would be advantageous if movement needed to be restricted to one plane, for example if movement in another plane causes the cable outer 114 to come into contact with a potentially damaging surface.

In further embodiments it will be possible to provide an adjusting mechanism to allow the second end fitting 118 to be adjusted relative to a housing such that the working length of the cable inner relative to the cable outer 114 can be corrected.

Furthermore, internal sides 34A and corresponding external surface 29 need not be of cylindrical form in order to allow for adjustment prior to ultrasonic welding.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A housing assembly comprising: a housing and a cable assembly, the cable assembly including a cable outer, a first fitting, a second fitting, and a cable inner, the first fitting being connected to the cable outer, and including a first through hole and a first engagement portion, the second fitting including a second through hole and a second engagement portion, the cable inner passing through the first through hole and the second through hole, with the first engagement portion abutting the second engagement portion, wherein the second fitting is secured to the housing by ultrasonic welding and wherein the first engagement portion and the second engagement portion form a break to limit the transmission of ultrasonic vibration between the first engagement portion and the second engagement portion.

2. The housing assembly according to claim 1 in which engagement between the first engagement portion and the second engagement portion permits relative axial movement between the first fitting and the second fitting in at least one plane.

3. The housing assembly according to claim 1 in which one of the first engagement portion and the second engagement portion has a convex form to reduce the change in working length of the cable inner relative to the cable outer as the cable inner and the cable outer flex.

4. The housing assembly according to claim 3 in which the other of the first engagement portion and the second engagement portion has a concave form to allow further flexing of the cable outer and the cable inner.

5. The housing assembly as defined in claim 1 wherein the cable inner includes an end fitting shaped to retain the second fitting on the cable assembly.

6. The housing assembly according to claim 1 in which the housing is part of a latch assembly.

7. The housing assembly according to claim 1 in which the second fitting is slideably adjustable relative to the housing to provide a predetermined length of cable inner relative to the cable outer prior to securing the second fitting to the housing.

8. The housing assembly according to claim 2 in which engagement between the first engagement portion and the second engagement portion permits relative lateral movement between the first fitting and the second fitting in two planes.

9. The housing assembly according to claim 1 wherein the second fitting is non-releaseably secured to the housing by ultrasonic welding.

10. The housing assembly according to claim 1 in which engagement between the first engagement portion and the second engagement portion permits translational movement between the first fitting and the second fitting.

11. The housing assembly according to claim 1 in which engagement between the first engagement portion and the second engagement portion permits non-rotational movement between the first fitting and the second fitting.

12. A housing assembly comprising: a housing and a cable assembly, the cable assembly including a cable outer, a first fitting, a second fitting, and a cable inner, the first fitting being connected to the cable outer, and including a first through hole and a first engagement portion, the second fitting including a second through hole and a second engagement portion, the cable inner passing through the first through hole and the second through hole, with the first engagement portion abutting the second engagement portion, wherein the second fitting is secured to the housing by ultrasonic welding in which engagement between the first engagement portion and the second engagement portion permits pivoting movement between the first fitting and the second fitting.

13. The housing assembly according to claim 12 in which engagement between the first engagement portion and the second engagement portion permits relative axial movement between the first fitting and the second fitting in at least one plane.

14. The housing assembly according to claim 12 in which one of the first engagement portion and the second engagement portion has a convex form to reduce the change in working length of the cable inner relative to the cable outer as the cable inner and the cable outer flex.

15. The housing assembly according to claim 14 in which the other of the first engagement portion and the second engagement portion has a concave form to allow further flexing of the cable outer and the cable inner.

16. The housing assembly according to claim 12 in which the second fitting is slideably adjustable relative to the housing to provide a predetermined length of cable inner relative to the cable outer prior to securing the second fitting to the housing.

\* \* \* \* \*